(12) United States Patent
Tanaka (10) Patent No.: US 11,616,789 B2
(45) Date of Patent: Mar. 28, 2023

(54) COMMUNICATION SYSTEM, COMMUNICATION METHOD, AND COMPUTER PROGRAM PRODUCT

(71) Applicant: KABUSHIKI KAISHA TOSHIBA, Tokyo (JP)

(72) Inventor: Yasuyuki Tanaka, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 72 days.

(21) Appl. No.: 17/185,642

(22) Filed: Feb. 25, 2021

(65) Prior Publication Data

US 2022/0086171 A1 Mar. 17, 2022

(30) Foreign Application Priority Data

Sep. 11, 2020 (JP) .............................. JP2020-153219

(51) Int. Cl.
*H04L 9/20* (2006.01)
*H04L 9/40* (2022.01)
*H04L 9/08* (2006.01)
*H04L 9/32* (2006.01)

(52) U.S. Cl.
CPC .......... *H04L 63/126* (2013.01); *H04L 9/0869* (2013.01); *H04L 9/3228* (2013.01); *H04L 63/0435* (2013.01)

(58) Field of Classification Search
CPC ...... H04L 63/126; H04L 63/0435; H04L 9/20
See application file for complete search history.

(56) References Cited

U.S. PATENT DOCUMENTS

2016/0373418 A1* 12/2016 Stahl ....................... H04L 63/08
2017/0310674 A1* 10/2017 Markham ............. H04L 9/0825
2021/0084027 A1* 3/2021 Johnston ............... H04L 63/123

FOREIGN PATENT DOCUMENTS

JP 2014-48800 A 3/2014

OTHER PUBLICATIONS

G. Mandyam et al., "The Entity Attestation Token (EAT)," IETF Internet—Draft, 35 pages (Feb. 20, 2020).

* cited by examiner

*Primary Examiner* — William S Powers
(74) *Attorney, Agent, or Firm* — Finnegan, Henderson, Farabow, Garrett & Dunner, LLP (57) ABSTRACT

A communication system according to an embodiment includes one or more hardware processors. The one or more hardware processors: transmit, to an external communication system, a cryptographic random number obtained by encrypting a random number; receive verification information for verifying the external communication system, the verification information being generated by the external communication system with the cryptographic random number and attribute information of the external communication system; and perform, by using a cryptographic key based on the random number, communication with the external communication system having been verified with the verification information.

10 Claims, 11 Drawing Sheets

FIG.3

| CLIENT | VERIFICATION RESULT | CRYPTOGRAPHIC KEY | EXPIRATION DATE |
|---|---|---|---|
| A | PASS | XXXXX | T1 |
| B | PASS | YYYYY | T2 |
| C | FAIL | - | - |
| D | PASS | ZZZZZZ | T3 |

COMMUNICATION SYSTEM, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2020-153219, filed on Sep. 11, 2020; the entire contents of which are incorporated herein by reference.

FIELD

Embodiments described herein relate to a communication system, a communication method, and a computer program product.

BACKGROUND

A technique called remote attestation has been known as a mechanism to, when communicating with a communication system remotely located, verify whether the communication system is in an assumed state in addition to whether it is an assumed communication partner. Examples of an attribute that indicates the assumed state include a hardware version and a software version. Even if the communication partner has been tampered, the fact that it has been tampered can be detected by the remote attestation.

When the proper state of the communication partner has been verified by the remote attestation, communication with the communication partner is performed using a cryptographic key, for example. It is desired that processes such as exchange of the cryptographic key to be used for communication between communication systems (communication apparatuses) be more efficiently performed.

DETAILED DESCRIPTION

A communication system according to an embodiment includes one or more hardware processors. The one or more hardware processors are configured to: transmit, to an external communication system, a cryptographic random number obtained by encrypting a random number; receive verification information for verifying the external communication system, the verification information being generated by the external communication system with the cryptographic random number and attribute information of the external communication system; and perform, by using a cryptographic key based on the random number, communication with the external communication system having been verified with the verification information.

Preferred embodiments of a communication system described herein will now be described in detail with reference to the attached drawings.

An outline of remote attestation will be described first. For convenience of description, one of two nodes included in the communication system is called a client, and the other is called a server. The client is a node to be verified. The server is a node that verifies the client by the remote attestation. When verification is performed interactively, each node only needs to have functions of both the server and the client.

The server requests the client to send attribute information. At this time, the server transmits a "nonce" (for example, a random number) for preventing a replay attack to the client. The client collects its own attribute information, generates authentication data based on its own secret information (a public key or a cryptographic key of symmetric key cryptography), and generates a token using the collected attribute information, the nonce, and the authentication data. The token corresponds to verification information for the server to verify the client. The client transmits the token to the server. The server checks that the nonce transmitted in advance matches the nonce included in the received token, and also verifies the authentication data. When the verification of the authentication data has succeeded, the server checks the attribute information obtained from the client, and performs some kind of judgment processing on whether to accept this client, for example.

In the following embodiments, the server transmits a random number as the nonce, which has been encrypted with the secret information of the client to the client. The client transmits the attribute information to the server, and then decrypts the nonce with its own secret information to obtain the random number before the encryption. From then on, this random number is set as a cryptographic key to be used for protection of communication with the server. When having checked the attribute information of the client and decided to accept the client, the server sets the initially generated random number as the cryptographic key to be used for communication with the client and uses it for protection of communication with the client. By such processing, exchange of a cryptographic key to be used for communication between nodes can be efficiently performed.

First Embodiment

Figure 1:
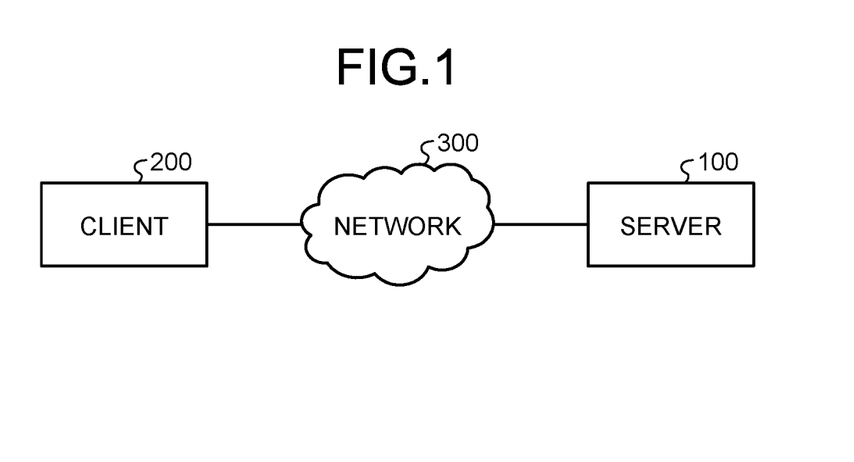
FIG. 1 is a block diagram of a communication system according to a first embodiment.

FIG. 1 is a block diagram illustrating one example of a configuration of a communication system according to a first embodiment. As illustrated in FIG. 1, the communication system according to the present embodiment has a configuration that a server 100 and a client 200 are connected over a network 300.

The server 100 and the client 200 can communicate with each other via the network 300. The network 300 is typically an open wide area network such as the Internet, but is not limited to this, and may be any type of network. For example, the network 300 may be a closed network, or may be a local area network.

The server 100 has an expected value for attribute information of the client 200. Examples of the attribute information include a manufacturer, current configuration information, and the operating state of the client 200. The server 100 verifies whether the state of the client 200 matches the expected value before application communication, for example. This verification processing is called "remote attestation".

In FIG. 1, a single server 100 and a single client 200 are illustrated. Alternatively, each apparatus may be provided in two or more in number. When two or more clients 200 are provided, the server 100 performs the remote attestation for each client 200. Furthermore, the network 300 may include networks in a plurality of different forms. For example, when two or more servers 100 and two or more clients 200 are provided, each server 100 and each client 200 may be configured to use any of the networks.

Figure 2:
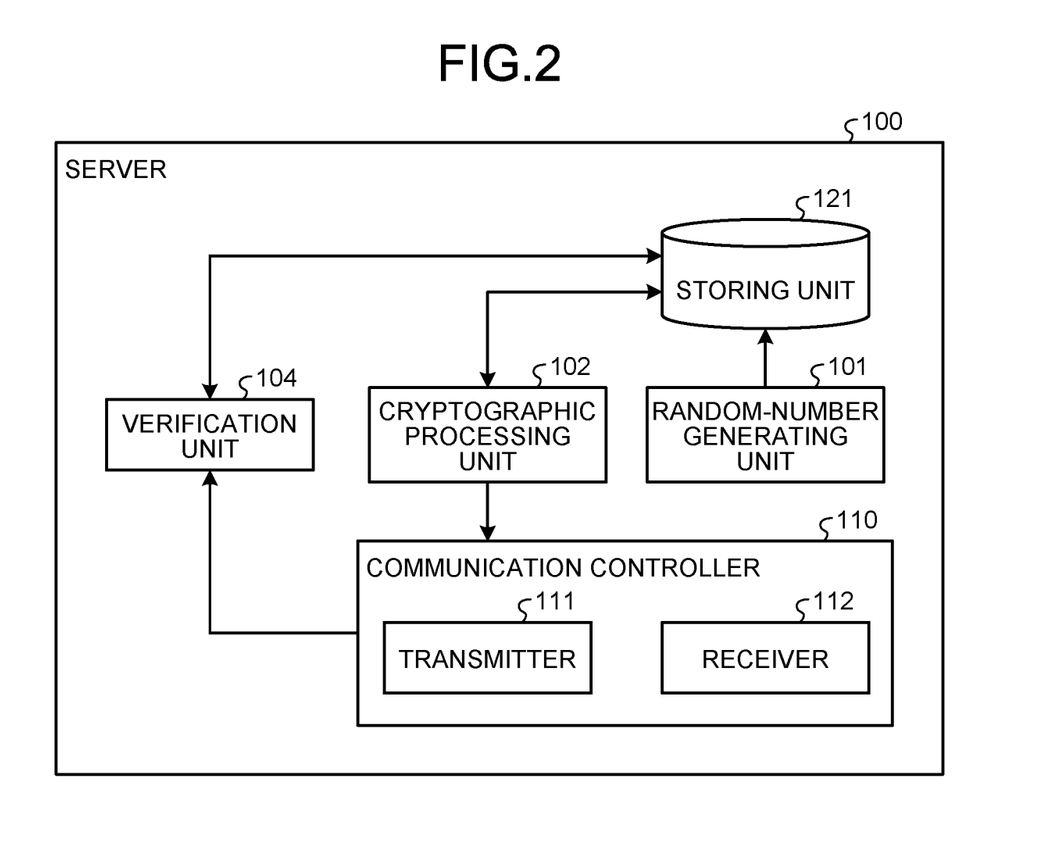
FIG. 2 is a block diagram of a server in the first embodiment.

FIG. 2 is a block diagram illustrating a functional configuration example of each server 100. As illustrated in FIG. 2, the server 100 includes a storing unit 121, a random-number generating unit 101, a cryptographic processing unit 102, a verification unit 104, and a communication controller 110.

The storing unit 121 stores various types of information to be used in various types of processing by the server 100. For example, the storing unit 121 stores information on each client 200 (hereinafter, called "client information"). Examples of the client information include pieces of information as follows:
  Attribute information (an expected value of attribute information) of an assumed client 200
  A random number (information to be used as a cryptographic key after verification by the remote attestation) generated by the random-number generating unit 101
  Secret information (a public key of public key cryptography or a cryptographic key of symmetric key cryptography) of the client 200;
  A random number (value to be transmitted as a nonce to the client 200) that has been encrypted with the secret information of the client 200
  A verification result of a token obtained by the verification unit 104

Figure 3:
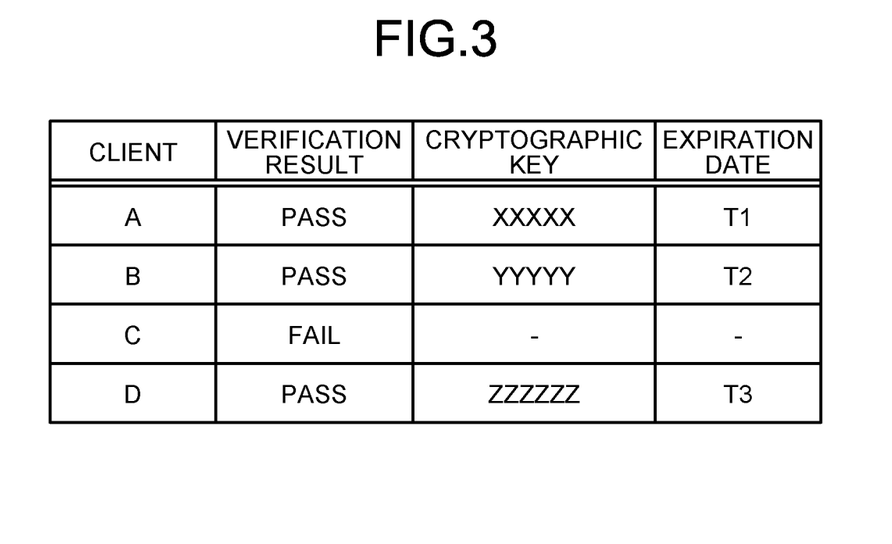
FIG. 3 is a table illustrating one example of a data structure of client information.

FIG. 3 is a table illustrating one example of a data structure of the client information stored in the storing unit 121. As illustrated in FIG. 3, the client information includes information (client) for identifying a client 200, a verification result of a token, a cryptographic key, and an expiration date of the cryptographic key. The cryptographic key is a random number generated by the random-number generating unit 101. The data structure in FIG. 3 is merely one example, and is not limited to this. For example, the client information may further include information described above and other information.

The storing unit 121 and respective storing units described below can each be configured with a flash memory, a memory card, a random access memory (RAM), a hard disk drive (HDD), and any type of commonly used recording medium such as an optical disk.

The random-number generating unit 101 generates a random number. The method for generating the random number may be any type of method.

The cryptographic processing unit 102 performs encryption processing and decryption processing on information. For example, the cryptographic processing unit 102 encrypts a random number generated by the random-number generating unit 101, using secret information that is set in advance for a client 200. Hereinafter, a random number that has been encrypted is also called "cryptographic random number".

The verification unit 104 verifies a token received from a client 200. The method for verifying the token may be any type of method used in the remote attestation.

The communication controller 110 controls communication with an external communication system such as a client 200. The communication controller 110 includes a transmitter 111 and a receiver 112. Herein, at least one of the transmitter 111 and the receiver 112 may be provided outside the communication controller 110.

The transmitter 111 transmits information to the external communication system. For example, the transmitter 111 transmits a cryptographic random number as a nonce for preventing a replay attack to a client 200 (one example of the external communication system).

The receiver 112 receives information from the external communication system. For example, the receiver 112 receives a token (one example of the verification information) from the client 200.

When verification is performed with the token, the communication controller 110 communicates with the client 200 by using a cryptographic key based on the random number. In the present embodiment, the communication controller 110 performs communication using the random number itself as the cryptographic key.

Each of the above-described units (the random-number generating unit 101, the cryptographic processing unit 102, the verification unit 104, and the communication controller 110) is implemented by one or more processors. For example, each unit may be implemented by causing a hardware processor, such as a central processing unit (CPU), to execute a computer program. That is, each unit may be implemented by software. Alternatively, each unit may be implemented by a hardware processor such as a dedicated integrated circuit (IC), that is, implemented by hardware. Each unit may be implemented by the software and the hardware in combination. When a plurality of processors are used, each processor may implement one of the respective units or may implement two or more of the respective units.

Figure 4:
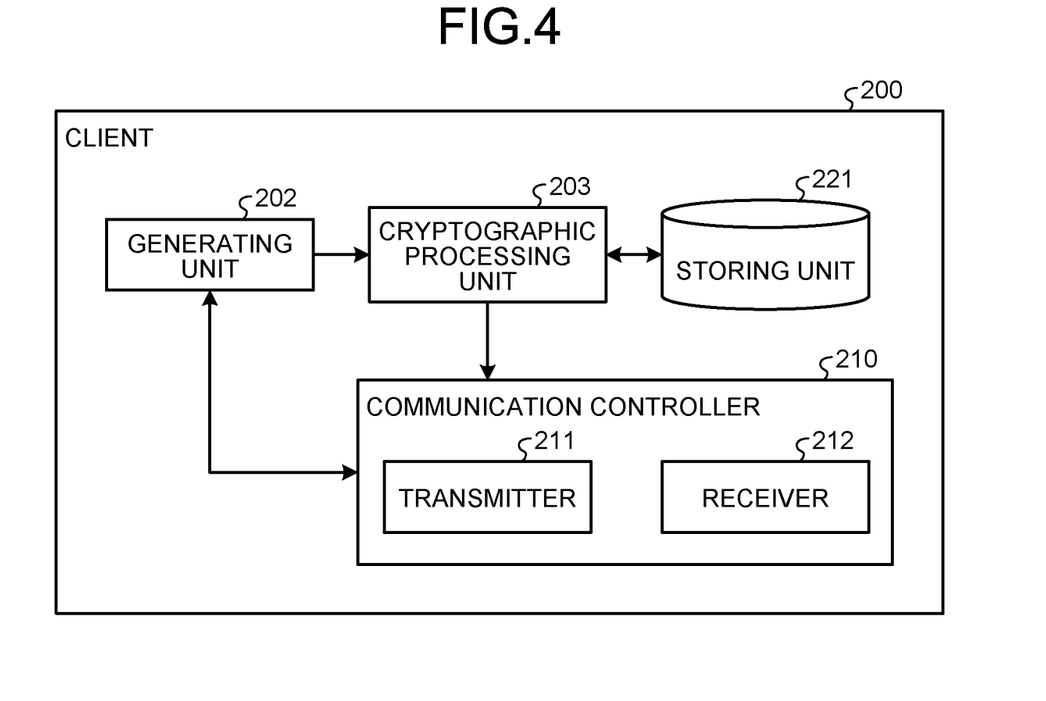
FIG. 4 is a block diagram of a client in the first embodiment.

FIG. 4 is a block diagram illustrating a functional configuration example of each client 200. As illustrated in FIG. 4, the client 200 includes a storing unit 221, a communication controller 210, a generating unit 202, and a cryptographic processing unit 203.

The storing unit 221 stores various types of information to be used in various types of processing by the client 200. For example, the storing unit 221 stores secret information that is set in advance (at least one of a key pair of public key cryptography and a cryptographic key of symmetric key cryptography). The storing unit 221 is implemented typically by tamper-resistant hardware. This enables the secret information to be safely stored.

The key pair of public key cryptography or the cryptographic key of symmetric key cryptography is used in the remote attestation. The following mainly describes an example in which the key pair of public key cryptography is used.

The communication controller 210 controls communication with an external communication system such as a server 100. The communication controller 210 includes a transmitter 211 and a receiver 212. Herein, at least one of the transmitter 211 and the receiver 212 may be provided outside the communication controller 210.

The transmitter 211 transmits information to the external communication system. For example, the transmitter 211 transmits a token generated by the generating unit 202 to the server 100.

The receiver 212 receives information from the external communication system. For example, the receiver 212 receives a nonce that is a cryptographic random number from the server 100.

When verification is performed with the token, the communication controller 210 communicates with the server 100 by using a cryptographic key based on the random number. In the present embodiment, the communication controller 210 performs communication using the random number itself as the cryptographic key.

The generating unit 202 generates a token (verification information) for verifying the client 200. For example, in accordance with instructions from the server 100, the generating unit 202 collects necessary attribute information, and generates a token using the collected attribute information and a nonce (a cryptographic random number) received from the server 100. The generating unit 202 may generate a token to which authentication data has been added. The authentication data may be, for example, a signature that is generated with a public key stored in the storing unit 221, for example.

The cryptographic processing unit 203 performs encryption processing and decryption processing on information. For example, the cryptographic processing unit 203 decrypts the cryptographic random number transmitted from the server 100 to obtain a random number.

Each of the above-described units (the communication controller 210, the generating unit 202, and the cryptographic processing unit 203) is implemented by one or a plurality of processors. For example, each unit may be implemented by causing a hardware processor such as a CPU to execute a computer program. That is, each unit may be implemented by software. Alternatively, each unit may be implemented by a processor such as a dedicated IC, that is, by hardware. Each unit may be implemented by the software and the hardware in combination. When a plurality of processors are used, each processor may implement one of the respective units or may implement two or more of the respective units.

Figure 5:
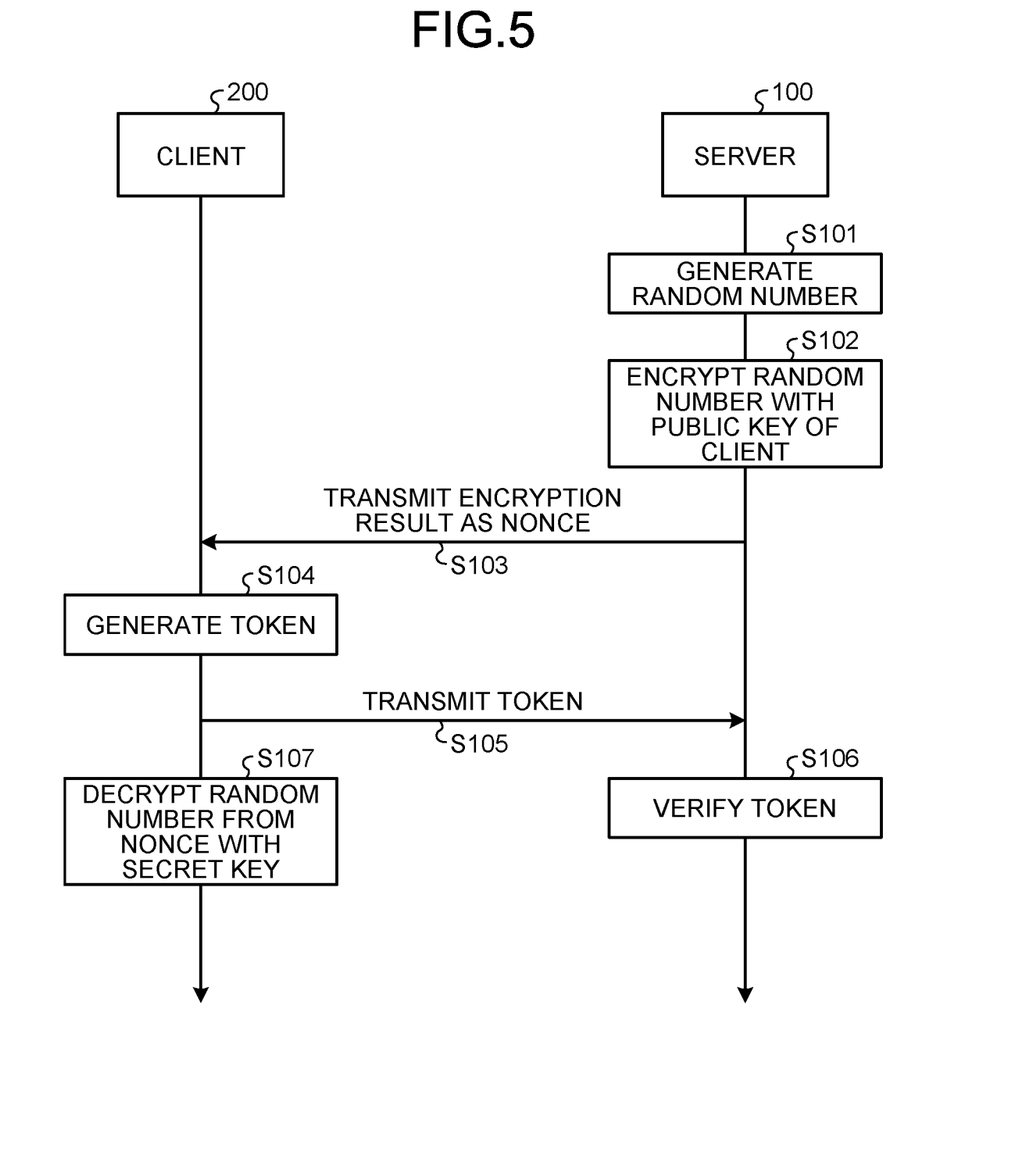
FIG. 5 is a sequence diagram of verification processing in the first embodiment.

The following describes verification processing performed by the communication system according to the first embodiment thus configured. FIG. 5 is a sequence diagram illustrating one example of the verification processing in the first embodiment.

To begin with, the random-number generating unit 101 of the server 100 generates a random number (step S101). The cryptographic processing unit 102 encrypts the generated random number with a public key of the client 200 (step S102). The transmitter 111 transmits a cryptographic random number resulting from the encryption processing as a nonce to the client 200 (step S103).

The generating unit 202 of the client 200 generates a token that includes attribute information of the client 200 itself, the nonce, and authentication data generated with the public key of the client 200 (step S104). The transmitter 211 transmits the generated token to the server 100 (step S105).

The verification unit 104 of the server 100 verifies the token received by the receiver 112 (step S106). For example, the verification unit 104 verifies whether the authentication data and the nonce included in the token are correct. When the authentication data and the nonce are correct, the verification unit 104 verifies whether the attribute information included in the token matches attribute information of an assumed client 200.

Meanwhile, the cryptographic processing unit 203 of the client 200 decrypts the nonce with a secret key of the client 200 to obtain the random number (step S107).

With the processes described above, the server 100 and the client 200 are able to share the random number. From then on, the server 100 and the client 200 use the shared random number as a cryptographic key of symmetric key cryptography, thereby being able to protect communication between the server 100 and the client 200. Specifically, control can be performed such that no other clients than the client 200 having the cryptographic key shared in the remote attestation cannot transmit application data to the server 100.

Herein, the client 200 may be any type of equipment such as a general computer, a mobile terminal (a cellular phone, a smart phone, etc.), a camera device, or a sensor device.

The server 100 may be a server in any form such as a server for a cloud service, a server in an on-premise environment, or a computation node in a cellular phone network (what is called "multi-access edge computing (MEC)").

As described above, the secret information of the client 200 may be stored in tamper-resistant hardware, or may be stored in a common memory (storage). As one embodiment, the secret information may be stored in an IC chip such as a subscriber identity module (SIM) card.

As described above, when verification is performed interactively, roles of the server 100 and the client 200 are exchanged to perform the remote attestation. In this case, the processing illustrated in FIG. 5 is performed interactively (two times). With the two-time remote attestation, two cryptographic keys are shared. Depending on the direction of communication, the two cryptographic keys may be used properly. For example, when information is transmitted to a node that has generated a random number (cryptographic key), that is, a node that functions as a server 100, the cryptographic key generated by this server 100 may be used.

Examples of the attribute information to be transmitted by the client 200 include a manufacturer, a hardware version, a hardware configuration, a firmware version of the hardware, a basic input/output system (BIOS), an operating system (OS), a software version of an application, and the current operating state. The attribute information may include all of them, or may include some of them.

When the cryptographic key of symmetric key cryptography is used instead of the key pair of public key cryptography, for example, at step S102, the random number is encrypted with the cryptographic key of the client 200. At step S107, the nonce is decrypted with the cryptographic key of the client 200.

As described above, the communication system according to the first embodiment uses a cryptographic random number obtained by encrypting a random number as a nonce in the remote attestation, and also uses a random number obtained by decrypting the cryptographic random number as a cryptographic key for protection of the subsequent communications. With this processing, exchange of a cryptographic key to be used for communication between nodes can be efficiently performed.

Second Embodiment

A communication system according to a second embodiment includes a client system 200-2 instead of the client 200. The client system 200-2 is not a single device, and includes a plurality of components (devices, systems, nodes, etc.).

Figure 6:
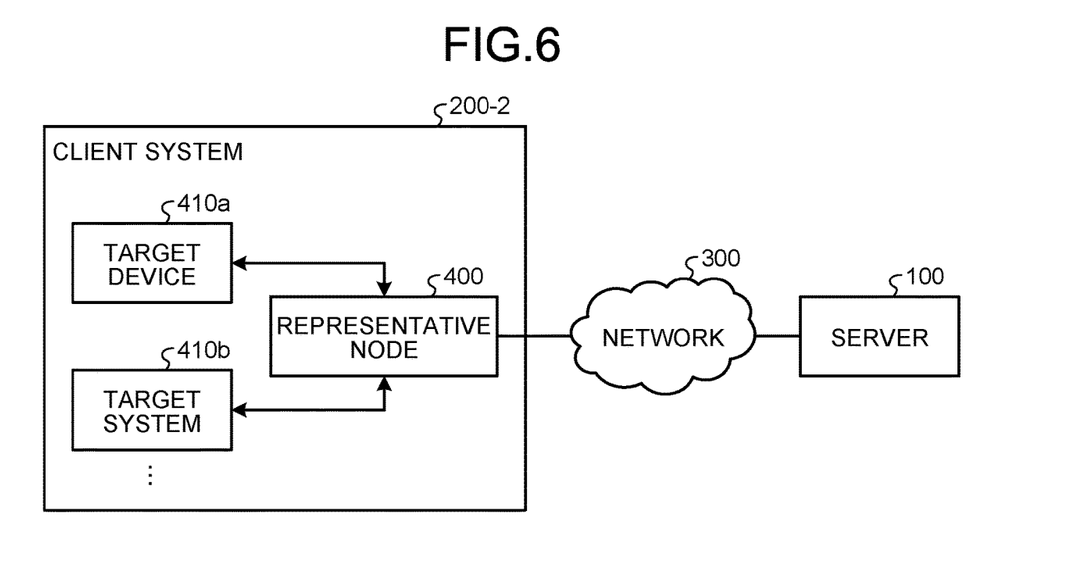
FIG. 6 is a block diagram of a communication system according to a second embodiment.

FIG. 6 is a block diagram illustrating one example of a configuration of the communication system according to the second embodiment. As illustrated in FIG. 6, the communication system according to the present embodiment has a configuration that the server 100 and the client system 200-2 are connected over the network 300.

The second embodiment is different from the first embodiment in that, the client system 200-2 is included in place of the client 200. The other configurations and functions are the same as those in FIG. 1 that is a block diagram of the communication system according to the first embodiment, and thus are designated by the same reference numerals, and description thereof is omitted herein.

The client system 200-2 includes a representative node 400 (one example of a representative communication system), a target device 410a, and a target system 410b.

The representative node 400 is a node that communicates with the server 100. The target device 410a and the target system 410b are a device and a system (one example of internal systems) for which the remote attestation is to be performed. The target device 410a and the target system 410b each may be provided in plurality. Either the target device 410a or the target system 410b may be provided.

The target device 410a and the target system 410b are connected to the representative node 400 by serial communication and a local area network, for example.

The target system 410b is a system including a plurality of devices. The devices included in the target system 410b and the target device 410a may be any types of devices, and examples thereof include a computer, a mobile terminal, a camera device, and a sensor device.

Figure 7:
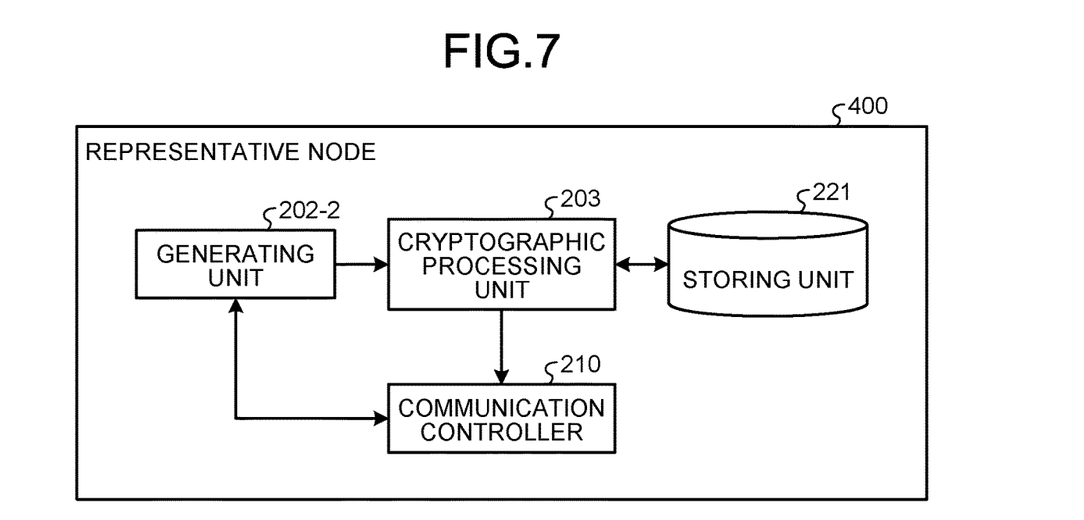
FIG. 7 is a block diagram of a configuration of a representative node in the second embodiment.

FIG. 7 is a block diagram illustrating one example of a configuration of the representative node 400. As illustrated in FIG. 7, the representative node 400 includes the storing unit 221, the communication controller 210, a generating unit 202-2, and the cryptographic processing unit 203. Configurations other than the generating unit 202-2 of the representative node 400 are the same as those of the client 200 in the first embodiment, and thus are designated by the same reference numerals, and description thereof is omitted.

The generating unit 202-2 is different from the generating unit 202 of the first embodiment in collecting necessary attribute information from some or all of the representative node 400 itself, the target device 410a, and the target system 410b, and generating a token as the client system 200-2.

Verification processing in the present embodiment is the same as in the sequence diagram of FIG. 5 illustrating the verification processing in the first embodiment other than that the client 200 is replaced with the client system 200-2.

The target device 410a and the target system 410b communicate with the server 100 via the representative node 400, or do not directly communicate with the server 100. In any case, data that the representative node 400, the target device 410a, and the target system 410b transmit to and receive from the server 100 is protected by using the cryptographic key (random number) shared in the verification processing.

As described above, in the second embodiment, in the communication system provided with the client system including a plurality of components, functions similar to those in the first embodiment can be implemented.

Third Embodiment

In a third embodiment, an example in which a token verification server that verifies a token is provided will be described.

Figure 8:
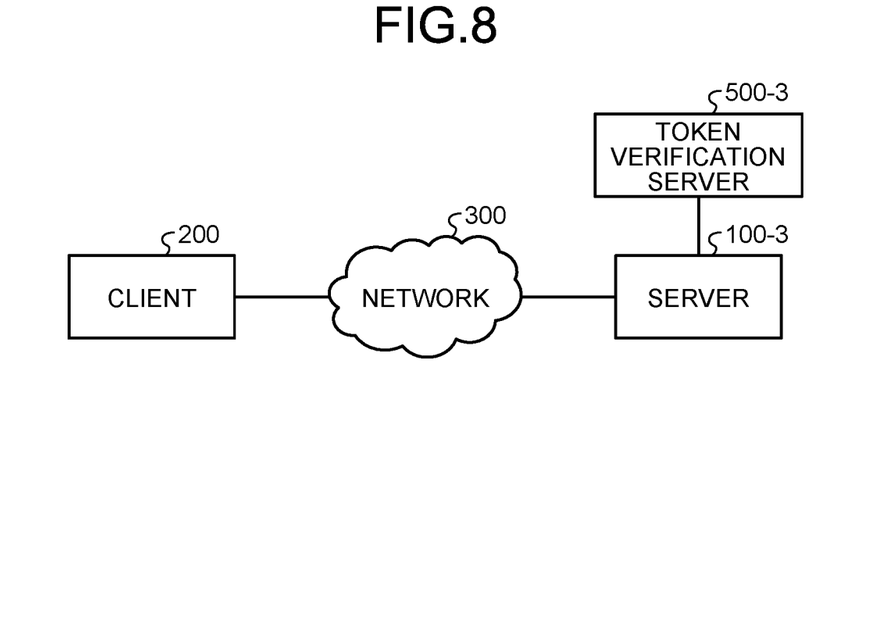
FIG. 8 is a block diagram of a communication system according to a third embodiment.

FIG. 8 is a block diagram illustrating one example of a configuration of a communication system according to the third embodiment. As illustrated in FIG. 8, the communication system according to the present embodiment has a configuration that a server 100-3, a client 200, and a token verification server 500-3 are connected over the network 300.

Figure 9:
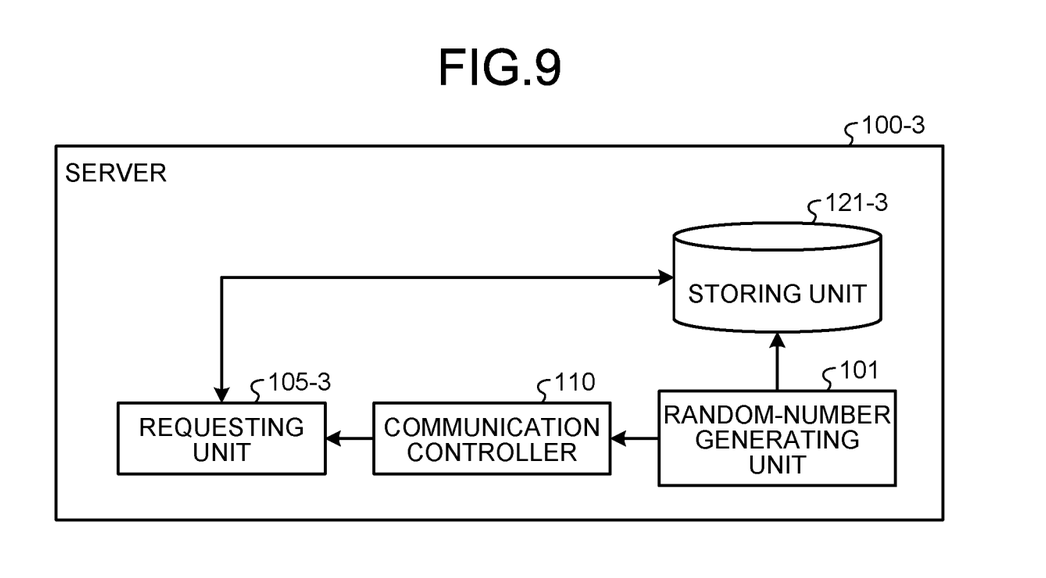
FIG. 9 is a block diagram of a server in the third embodiment.

FIG. 9 is a block diagram illustrating a functional configuration example of the server 100-3. As illustrated in FIG. 9, the server 100-3 includes a storing unit 121-3, the random-number generating unit 101, a requesting unit 105-3, and the communication controller 110.

The third embodiment is different from the first embodiment in that, the cryptographic processing unit 102 and the verification unit 104 are removed and the requesting unit 105-3 is added. Moreover, the function of the storing unit 121-3 is different from the storing unit 121 in the first embodiment. The other configurations and functions are the same as those in FIG. 1 that is a block diagram of the communication system according to the first embodiment, and thus are designated by the same reference numerals, and description thereof is omitted herein.

The storing unit 121-3 is different from the storing unit 121 according to the first embodiment described above in that, information to be used for verifying a token does not need to be stored therein. The information to be used for verifying a token is attribute information of an assumed client 200, for example.

The requesting unit 105-3 requests the token verification server 500-3 to execute processing. For example, the requesting unit 105-3 requests the token verification server 500-3 to encrypt a generated random number. The requesting unit 105-3 also requests the token verification server 500-3 to verify a token received from the client 200.

Figure 10:
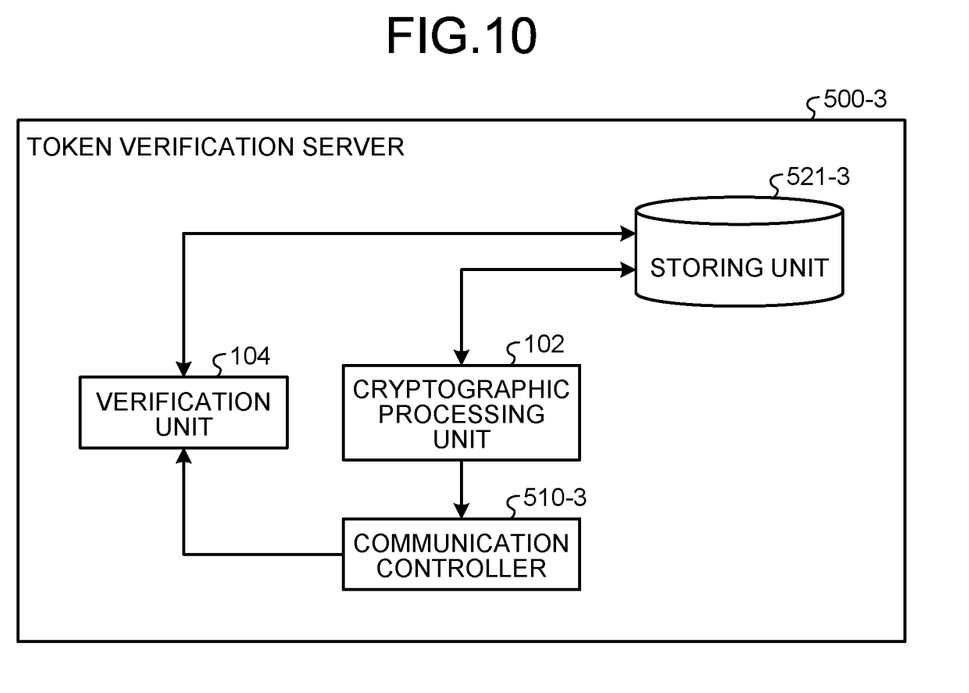
FIG. 10 is a block diagram of a token verification server in the third embodiment.

FIG. 10 is a block diagram illustrating a functional configuration example of the token verification server 500-3. As illustrated in FIG. 10, the token verification server 500-3 includes a storing unit 521-3, a communication controller 510-3, the cryptographic processing unit 102, and the verification unit 104.

The cryptographic processing unit 102 and the verification unit 104 are the same as the cryptographic processing unit 102 and the verification unit 104 included in the server 100 according to the first embodiment, and thus are designated by the same reference numerals, and description thereof is omitted.

The storing unit 521-3 stores various types of information to be used in various types of processing by the token verification server 500-3. For example, the storing unit 521-3 stores information to be used for verifying a token.

The communication controller 510-3 controls communication with an external communication system such as the server 100-3. For example, the communication controller 510-3 receives a request to verify a token from the server 100-3. The communication controller 510-3 also transmits a verification result of the token and a cryptographic random number encrypted by the cryptographic processing unit 102 to the server 100-3.

Figure 11:
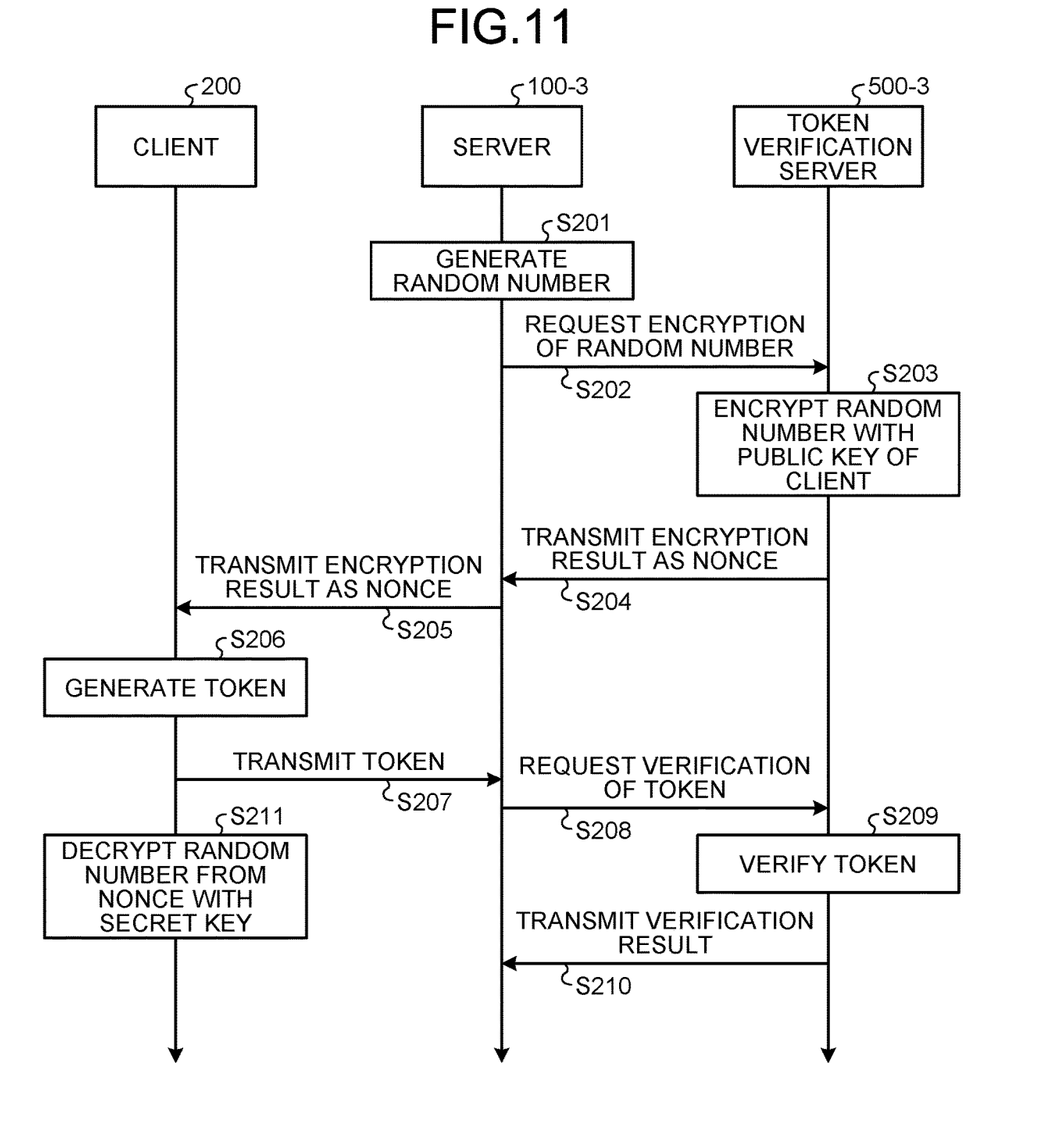
FIG. 11 is a sequence diagram of verification processing in the third embodiment.

The following describes verification processing performed by the communication system according to the third embodiment thus configured. FIG. 11 is a sequence diagram illustrating one example of the verification processing in the third embodiment.

The random-number generating unit 101 of the server 100 generates a random number (step S201). The requesting unit 105-3 requests the token verification server 500-3 to encrypt the generated random number (step S202).

The cryptographic processing unit 102 of the token verification server 500-3 encrypts the generated random number with a public key of the client 200 (step S203). The cryptographic processing unit 102 may receive the public key of the client 200 from the server 100-3, or may read it from the storing unit 521-3. The communication controller 510-3 transmits a cryptographic random number resulting from the encryption processing to the server 100-3 (step S204).

The transmitter 111 of the server 100-3 transmits the cryptographic random number as a nonce to the client 200 (step S205).

Step S206, step S207, and step S211 that are processes performed by the client 200 are the same as step S104, step S105, and step S107 in FIG. 5.

The requesting unit 105-3 of the server 100-3 requests the token verification server 500-3 to verify the token received from the client 200 (step S208).

The verification unit 104 of the token verification server 500-3 verifies the received token (step S209). The communication controller 510-3 transmits the verification result of the token to the server 100-3 (step S210).

As described above, in the present embodiment, the token verification server encrypts the random number generated by the server 100-3, and returns this result to the server 100-3. The server 100-3 transmits the returned random number (cryptographic random number) as a nonce to the client 200. Verification of the token received from the client 200 is requested of the token verification server 500-3 by the server 100-3. The verification unit 104 of the token verification server 500-3 performs the requested verification of the token.

In this way, in the third embodiment, the encryption processing of the random number and the verification of the token can be performed by the token verification server that is different from the server.

Fourth Embodiment

In a fourth embodiment, an example in which the token verification server further generates a random number will be described.

The configuration of a communication system according to the fourth embodiment is similar to the configuration of the communication system according to the third embodiment illustrated in FIG. 8. In the fourth embodiment, the server 100-3 and the token verification server 500-3 in FIG. 8 are replaced with a server 100-4 and a token verification server 500-4, respectively.

Figure 12:
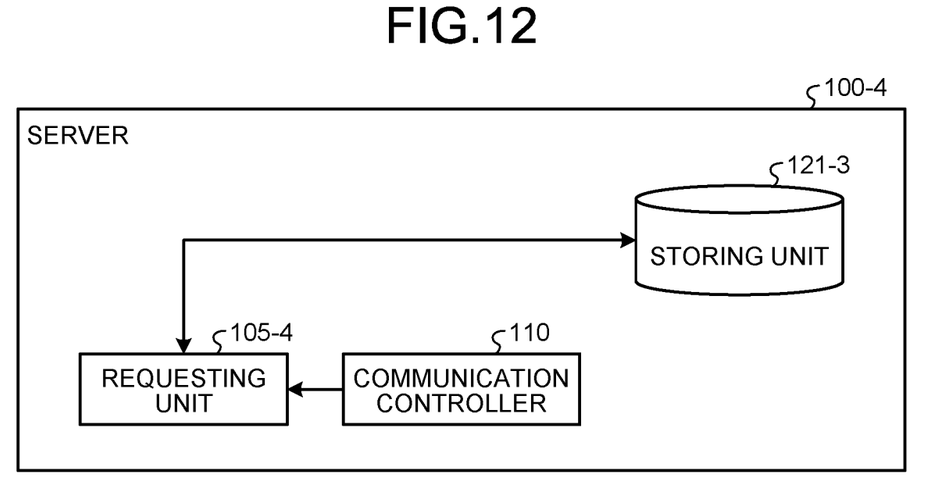
FIG. 12 is a block diagram of a server in a fourth embodiment.

FIG. 12 is a block diagram illustrating a functional configuration example of the server 100-4. As illustrated in FIG. 12, the server 100-4 includes the storing unit 121-3, a requesting unit 105-4, and the communication controller 110.

The fourth embodiment is different from the third embodiment in that the random-number generating unit 101 is omitted and in the function of the requesting unit 105-4. The other configurations and functions are the same as those in FIG. 9 that is a block diagram of the server 100-3 according to the third embodiment, and thus are designated by the same reference numerals, and description thereof is omitted herein.

The requesting unit 105-4 is different from the requesting unit 105-3 according to the third embodiment in that, the requesting unit 105-4 requests the token verification server 500-4 to generate a nonce.

Figure 13:
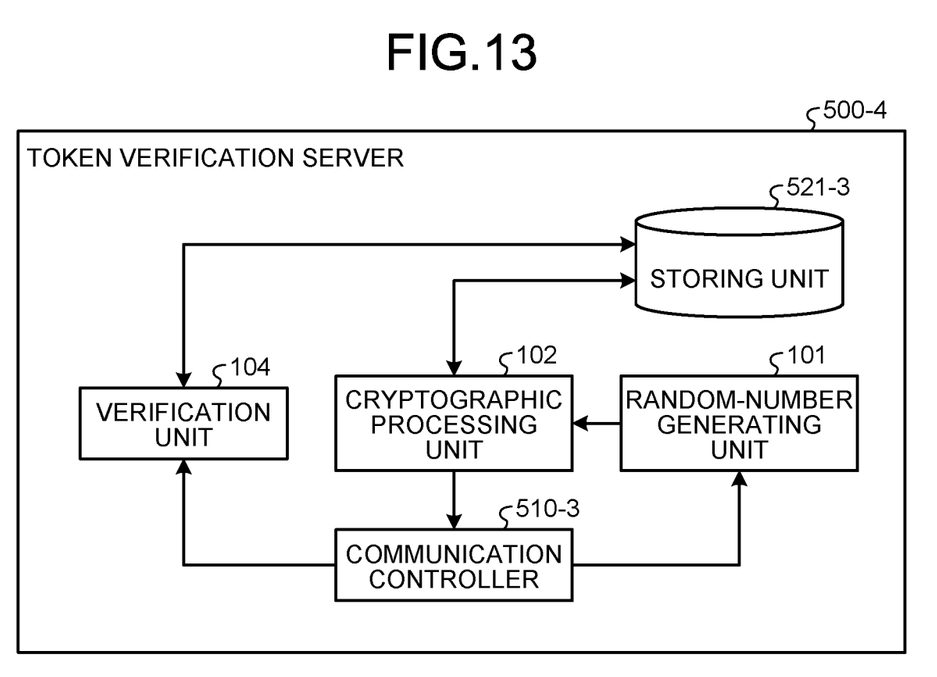
FIG. 13 is a block diagram of a token verification server in the fourth embodiment.

FIG. 13 is a block diagram illustrating a functional configuration example of the token verification server 500-4. As illustrated in FIG. 13, the token verification server 500-4 includes the storing unit 521-3, the communication controller 510-3, the random-number generating unit 101, the cryptographic processing unit 102, and the verification unit 104.

The random-number generating unit 101, the cryptographic processing unit 102, and the verification unit 104 are the same as the random-number generating unit 101, the cryptographic processing unit 102, and the verification unit 104 included in the server 100 according to the first embodiment, and thus are designated by the same reference numerals, and description thereof is omitted.

In comparison with the token verification server 500-3 in the third embodiment, the random-number generating unit 101 is added to the token verification server 500-4 in the present embodiment. The random-number generating unit 101 generates a random number in response to a request from the server 100-4 for generating a nonce.

Figure 14:
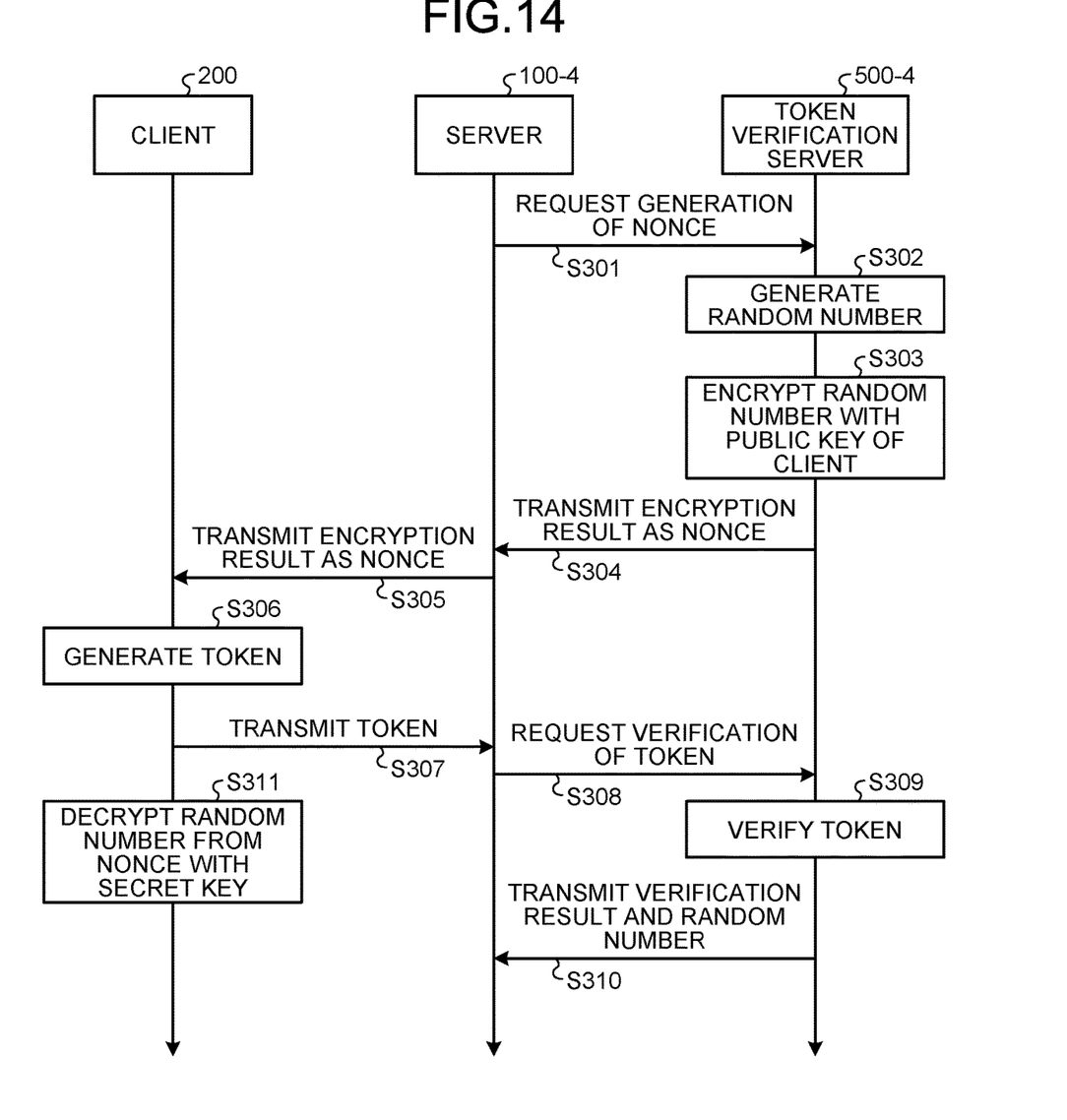
FIG. 14 is a sequence diagram of verification processing in the fourth embodiment.

The following describes verification processing performed by the communication system according to the fourth embodiment thus configured. FIG. 14 is a sequence diagram illustrating one example of the verification processing in the fourth embodiment.

The requesting unit 105-4 of the server 100 requests the token verification server 500-4 to generate a nonce (step S301).

The random-number generating unit 101 of the token verification server 500-4 generates a random number in response to the request (step S302).

The subsequent steps S303 to S309 and step S311 are the same as steps S203 to S209 and step S211 in FIG. 11 illustrating the verification processing in the third embodiment. Herein, at step S310, unlike at step S210, the communication controller 510-3 transmits to the server 100-4 the random number (cryptographic key) before being encrypted in addition to the verification result of the token (step S310).

As described above, in the fourth embodiment, the generation of the random number, the encryption processing of the random number, and the verification of the token can be performed by the token verification server that is different from the server.

Fifth Embodiment

In the above-described embodiments, the examples have been described such that a generated random number itself is used as a cryptographic key for communication. In a fifth embodiment, the generated random number is used as a key-generating key (that is, key information for generating a key), and a cryptographic key generated with the key-generating key is used for performing communication.

The configuration of a communication system according to the fifth embodiment is similar to the configuration of the communication system according to the first embodiment illustrated in FIG. 1. In the fifth embodiment, the server 100 and the client 200 in FIG. 1 are replaced with a server 100-5 and a client 200-5, respectively.

Figure 15:
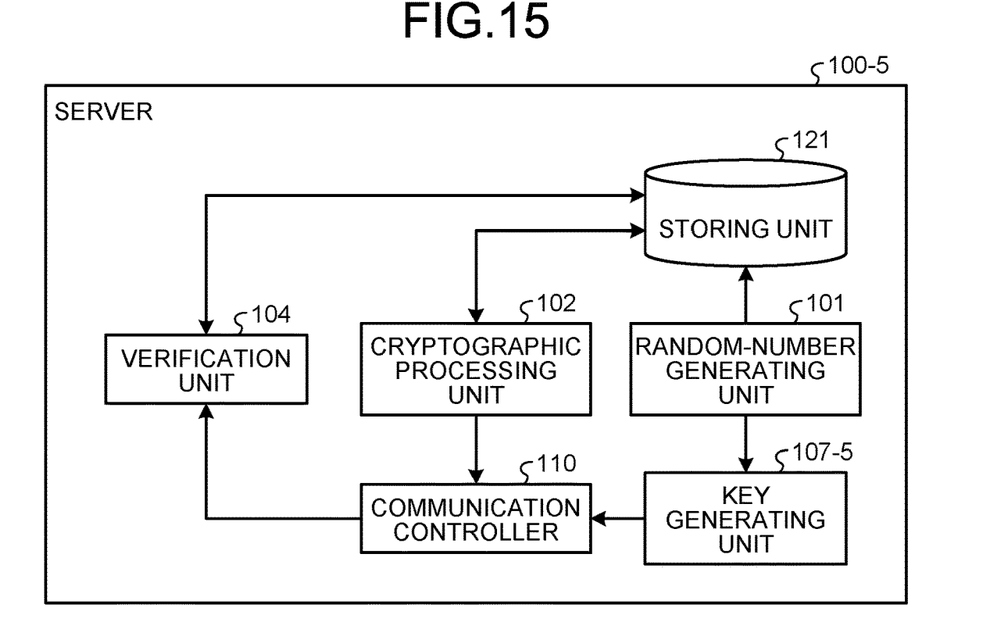
FIG. 15 is a block diagram of a server in a fifth embodiment.

FIG. 15 is a block diagram illustrating a functional configuration example of the server 100-5. As illustrated in FIG. 15, the server 100-5 includes the storing unit 121, the random-number generating unit 101, the cryptographic processing unit 102, the verification unit 104, the communication controller 110, and a key generating unit 107-5.

The fifth embodiment is different from the first embodiment in that the key generating unit 107-5 is added. The other configurations and functions are the same as those in FIG. 2 that is a block diagram of the server 100 according to the first embodiment, and thus are designated by the same reference numerals, and description thereof is omitted herein.

The key generating unit 107-5 generates a cryptographic key to be used for communication with the client 200-5 by using a random number shared with the client 200-5 as a key-generating key. The method of generating the cryptographic key may be any type of method, and a method using a hash-based message authentication code (HMAC) with a hush function, for example, can be used.

Figure 16:
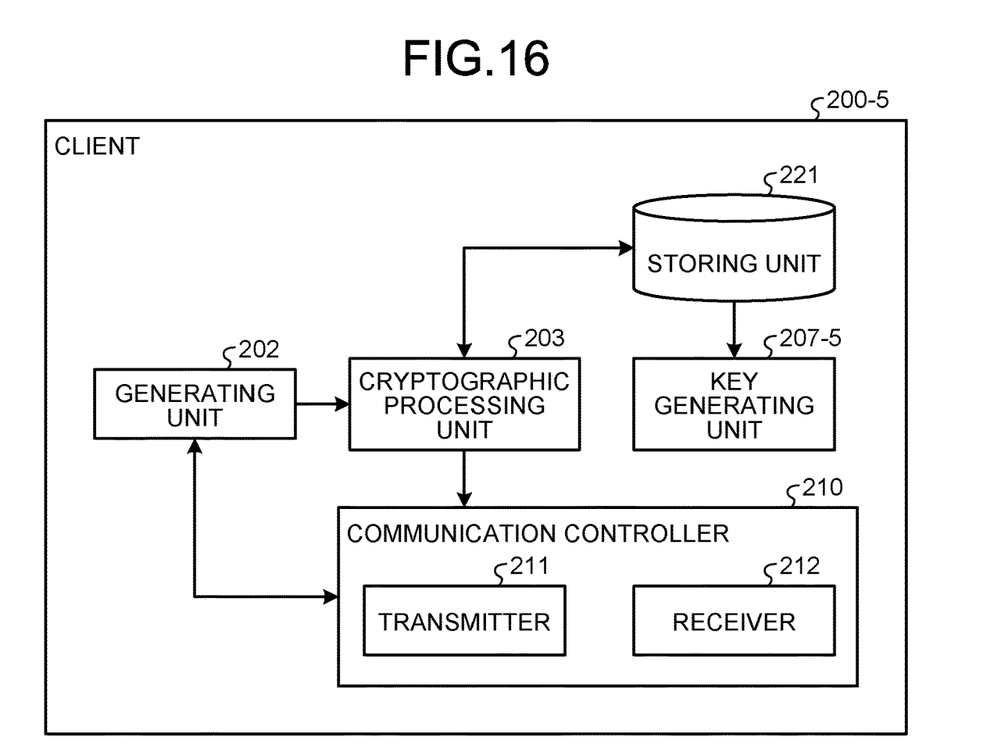
FIG. 16 is a block diagram of a client in the fifth embodiment.

FIG. 16 is a block diagram illustrating a functional configuration example of the client 200-5. As illustrated in FIG. 16, the client 200-5 includes the storing unit 221, the communication controller 210, the generating unit 202, the cryptographic processing unit 203, and a key generating unit 207-5.

The fifth embodiment is different from the first embodiment in that the key generating unit 207-5 is added. The other configurations and functions are the same as those in FIG. 4, which is a block diagram of the client 200 according to the first embodiment, and thus are designated by the same reference numerals, and description thereof is omitted herein.

The key generating unit 207-5 generates a cryptographic key to be used for communication with the server 100-5 by using a random number shared with the server 100-5 as a key-generating key. The method of generating the cryptographic key is the same as the generating method by the key generating unit 107-5 of the server 100-5. For example, the function for generating the cryptographic key from the key-generating key may be shared in advance between the server 100-5 and the client 200-5, or may be set by communication between the server 100-5 and the client 200-5.

With this configuration, cryptographic keys that are different depending on the use can be used, and many cryptographic keys the expiration dates of which are shorter than that of the remote attestation can be generated, for example.

Data to be used for generating a cryptographic key in combination with a key-generating key may be data that is set in advance for each use, for example, may be set by communication between the server 100-5 and the client 200-5, may be values such as times of day that are managed independently by the server 100-5 and the client 200-5, or may be a combination thereof.

As described above, in the communication system according to the fifth embodiment, a random number shared between the server and the client can be used as a key-generating key.

As described in the foregoing, according to the first to fifth embodiments, exchange of a cryptographic key for performing safe communication only with a communication partner that has been verified to be in an assumed state by the remote attestation can be more efficiently performed.

Figure 17:
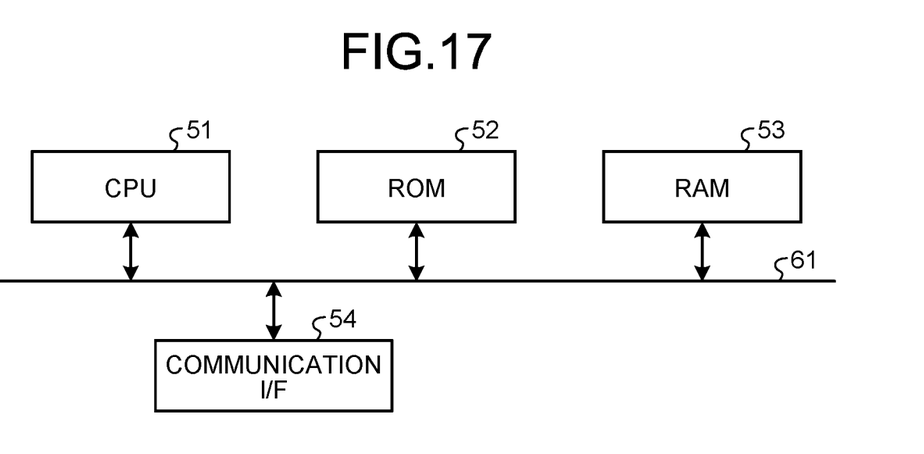
FIG. 17 is a hardware configuration diagram of each device according to the first to fifth embodiments.

The following describes a hardware configuration of each of apparatuses (the client, the server, the token verification server) of the communication systems according to the first to fifth embodiments with reference to FIG. 17. FIG. 17 is an explanatory diagram illustrating a hardware configuration example of each device according to the first to fifth embodiments.

Each of the devices according to the first to fifth embodiments includes a control apparatus such as a CPU 51, memories such as a read only memory (ROM) 52 and a RAM 53, a communication I/F 54 that is connected to a network to perform communication, and a bus 61 that connects between the respective units.

The computer program to be executed in each of the apparatuses according to the first to fifth embodiments is preinstalled in the ROM 52, for example, to be provided.

The computer program to be executed in each of the apparatuses according to the first to fifth embodiments may be configured to be recorded as an installable or executable file in a non-transitory computer-readable recording medium, such as a compact disk read only memory (CD-ROM), a flexible disk (FD), a compact disk recordable (CD-R), a digital versatile disk (DVD) and to be provided as a computer program product.

Alternatively, the computer program to be executed in each of the apparatuses according to the first to fifth embodiments may be configured to be stored in a computer connected to a network such as the Internet and to be downloaded via the network to be provided. Still alternatively, the computer program to be executed in each of the apparatuses according to the first to fifth embodiments may be configured to be provided or distributed via a network such as the Internet.

The computer program to be executed in each of the apparatuses according to the first to fifth embodiments can cause the computer to function as each unit of the corresponding communication system described above. In this computer, the CPU 51 can read the computer program from a computer-readable recording medium onto a main memory and execute it.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:
one or more hardware processors configured to:
transmit, to an external communication system, a cryptographic random number obtained by encrypting a random number;
receive verification information for verifying the external communication system, the verification information being generated by the external communication system with the cryptographic random number and attribute information of the external communication system; and
perform, by using a cryptographic key based on the random number, communication with the external communication system having been verified with the verification information.

2. The system according to claim 1, wherein
the external communication system includes one or more internal systems and a representative communication system, and the one or more hardware processors are configured to:
  receive the verification information generated by the representative communication system; and
  perform, by using the cryptographic key, communication with the representative communication system included in the external communication system having been verified with the verification information.

3. The system according to claim 1, wherein the one or more hardware processors are configured to:
  request a verification server to execute verification processing using the verification information received from the external communication system; and
  perform, by using the cryptographic key, communication with the external communication system having been verified by the verification server using the verification information.

4. The system according to claim 1, wherein the one or more hardware processors are configured to:
  request a verification server to generate a random number and generate the cryptographic random number obtained by encrypting the generated random number; and
  transmit the cryptographic random number generated by the verification server to the external communication system.

5. The system according to claim 1, wherein the one or more hardware processors are configured to:
  generate a cryptographic key by using the random number as key information for generating a key; and
  perform, by using the generated cryptographic key, communication with the external communication system having been verified with the verification information.

6. The system according to claim 1, wherein
  the one or more hardware processors are configured to:
    transmit, to the external communication system, the cryptographic random number as a nonce for preventing a replay attack to the external communication system.

7. The system according to claim 1, wherein
  the cryptographic key is obtained based on the random number without performing key exchanging after verifying the external communication system.

8. A communication method implemented by a computer, the method comprising:
  transmitting, to an external communication system, a cryptographic random number obtained by encrypting a random number;
  receiving verification information for verifying the external communication system, the verification information being generated by the external communication system with the cryptographic random number and attribute information of the external communication system; and
  performing, by using a cryptographic key based on the random number, communication with the external communication system having been verified with the verification information.

9. A computer program product comprising a non-transitory computer-readable recording medium on which an executable program is recorded, the program instructing a computer to:
  transmit, to an external communication system, a cryptographic random number obtained by encrypting a random number;
  receive verification information for verifying the external communication system, the verification information being generated by the external communication system with the cryptographic random number and attribute information of the external communication system; and
  perform, by using a cryptographic key based on the random number, communication with the external communication system having been verified with the verification information.

10. A communication system comprising:
  one or more hardware processors configured to:
    receive, from an external communication system, a cryptographic random number obtained by encrypting a random number;
    generate, by using the cryptographic random number and attribute information of the communication system, verification information for verifying the communication system,
    transmit the verification information to the external communication system; and
    perform, by using a cryptographic key based on the random number, communication with the external communication system when the communication system has been verified with the verification information.

* * * * *